United States Patent
Wymore et al.

(10) Patent No.: US 10,828,754 B2
(45) Date of Patent: Nov. 10, 2020

(54) FASTENER DISPENSER AND PRESENTATION VIA REMOVABLE MAGAZINE

(71) Applicant: Raytheon Company, Waltham, MA (US)

(72) Inventors: Jacob L. Wymore, Huntsville, AL (US); Brian Bartlett, Owens Cross Roads, AL (US)

(73) Assignee: Raytheon Company, Waltham, MA (US)

( * ) Notice: Subject to any disclaimer, the term of this patent is extended or adjusted under 35 U.S.C. 154(b) by 63 days.

(21) Appl. No.: 16/140,208

(22) Filed: Sep. 24, 2018

(65) Prior Publication Data

US 2020/0094385 A1   Mar. 26, 2020

(51) Int. Cl.
   *B25B 23/06*   (2006.01)
   *F16B 27/00*   (2006.01)

(52) U.S. Cl.
   CPC ............ *B25B 23/06* (2013.01); *F16B 27/00* (2013.01)

(58) Field of Classification Search
   None
   See application file for complete search history.

(56) References Cited

U.S. PATENT DOCUMENTS

| | | |
|---|---|---|
| 4,478,112 A | 10/1984 | Moulton |
| 4,784,026 A | 11/1988 | Kobayashi et al. |
| 4,998,452 A | 3/1991 | Blum |
| 5,144,870 A | 9/1992 | Nick |
| 5,697,521 A | 12/1997 | Dixon |
| 6,109,145 A | 8/2000 | Habermehl |
| 6,679,412 B1 | 1/2004 | Thomas et al. |
| 6,974,030 B1 | 12/2005 | Sundstrom |
| 7,658,283 B2 | 2/2010 | Pally et al. |

(Continued)

FOREIGN PATENT DOCUMENTS

| | | |
|---|---|---|
| DE | 10246336 A1 | 4/2004 |
| EP | 0838284 A2 | 4/1998 |

(Continued)

OTHER PUBLICATIONS

International Search Report for International Application No. PCT/US2019/043102 dated Oct. 28, 2019, 55 pages.

*Primary Examiner* — Gene O Crawford
*Assistant Examiner* — Ayodeji T Ojofeitimi

(57) ABSTRACT

A fastener dispenser tool for kitting and dispensing a plurality of fasteners comprises a retention section, a presentation section extending from the retention section, and a retention slot extending along the retention section and the presentation section. The retention slot is operable to retain the plurality of fasteners for dispensing therefore. A presentation slot extends along the presentation section and is sized to receive a tool bit engageable with a lead fastener. The retention slot and presentation slot are sized, such that the plurality of fasteners are each slidable through the retention slot along the presentation section to facilitate dispensing of the lead fastener from the presentation section. The presentation section can be formed at a curve relative to the retention section, to provide clearance of retained fasteners from hardware being fastened by the lead fastener. Associated systems and methods are provided.

19 Claims, 13 Drawing Sheets

(56) References Cited

U.S. PATENT DOCUMENTS

| | | |
|---|---|---|
| 8,544,369 B2 | 10/2013 | Park |
| 2003/0110908 A1* | 6/2003 | Habermehl ........... B25B 23/045 81/434 |
| 2003/0178333 A1* | 9/2003 | Pally ....................... B25B 23/06 206/345 |
| 2005/0035172 A1 | 2/2005 | Popovich et al. |
| 2009/0114697 A1 | 5/2009 | Gross et al. |
| 2012/0227256 A1 | 9/2012 | Clew et al. |
| 2017/0165740 A1 | 6/2017 | Lesperance |

FOREIGN PATENT DOCUMENTS

| | | |
|---|---|---|
| EP | 0903202 A2 | 3/1999 |
| JP | 2012-143848 A | 8/2012 |
| JP | 2014-226763 A | 12/2014 |
| KR | 10-2016-0120417 A | 10/2016 |

* cited by examiner

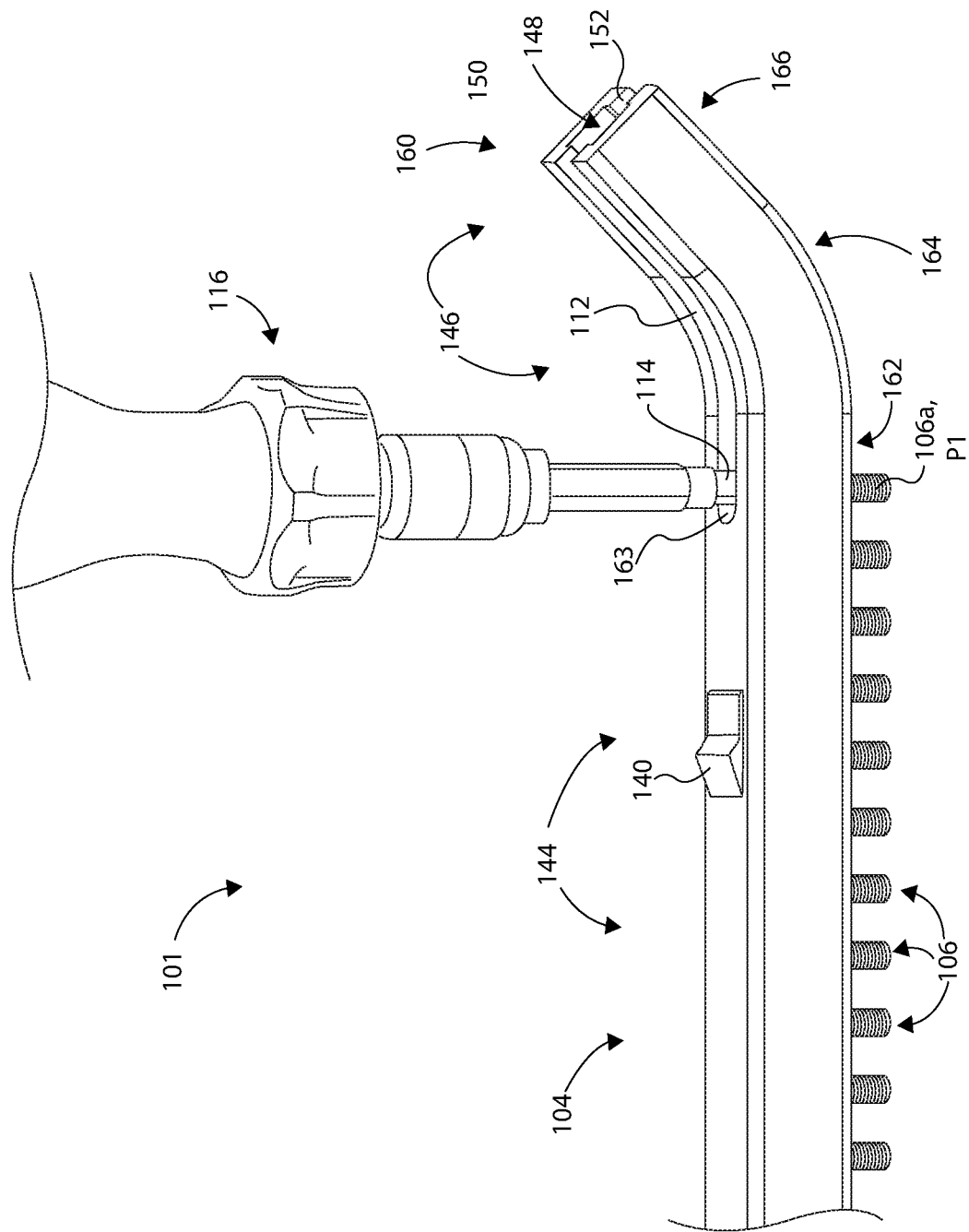

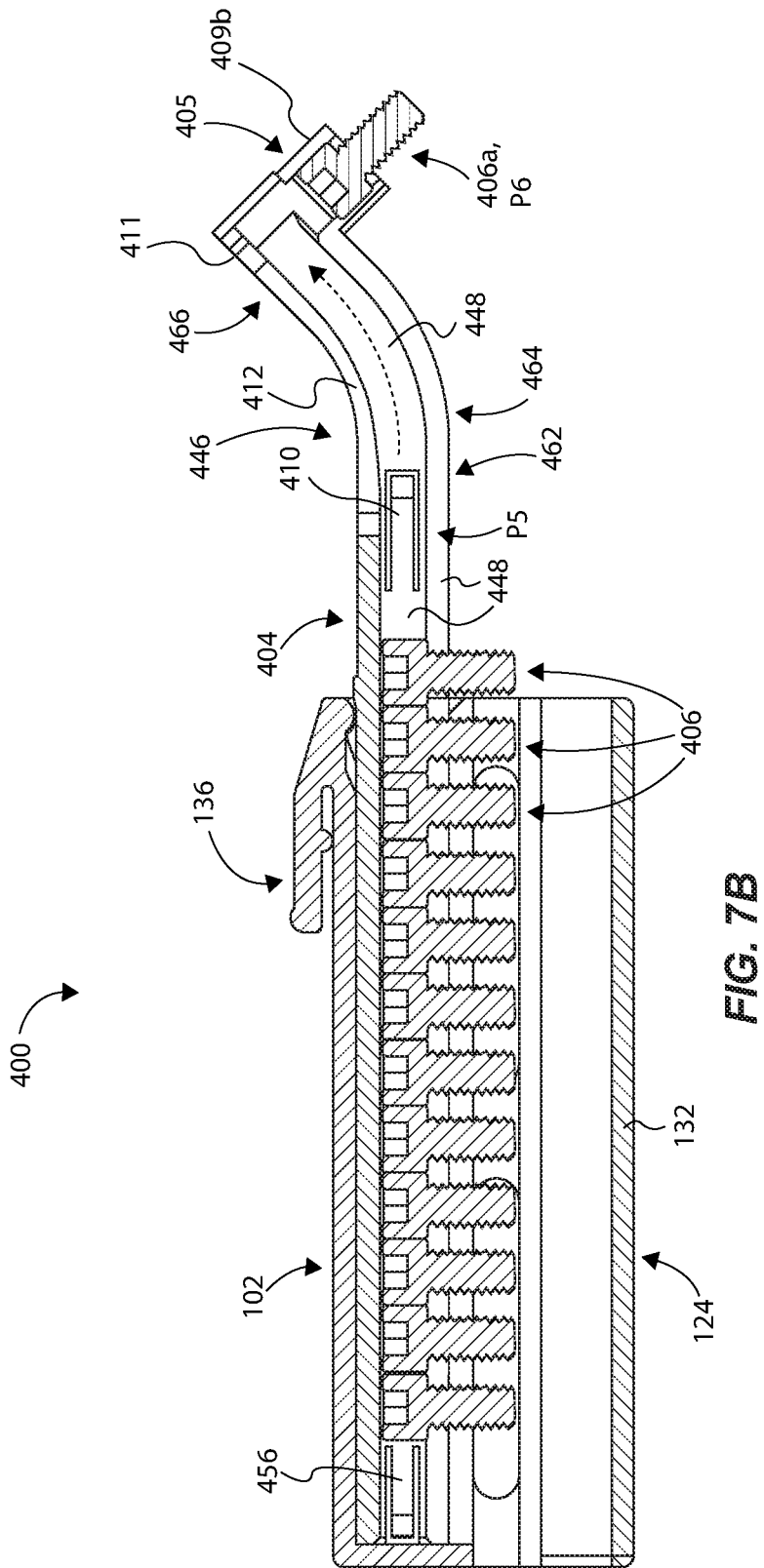

FASTENER DISPENSER AND PRESENTATION VIA REMOVABLE MAGAZINE

GOVERNMENT LICENSE RIGHTS

This invention was made with Government support under HQ0276-10-C-0005, awarded by the Missile Defense Agency. The Government has certain rights in this invention.

BACKGROUND

In many manufacturing facilities, an effective kitting process is integral for effective supply chain processes of fasteners to prevent foreign object debris (FOD) in the devices being assembled. More particularly, in the aerospace industry every fastener (nuts, washers, bolts, etc.) must be accounted for, otherwise spare or extra fasteners can become FOD in the aircraft being assembled. Prior processes include suppliers providing a specified number of fasteners in bags or other kits, so that the assemblers can readily keep track of the fasteners when being fastened to hardware. In many cases, chemicals (e.g., thread lock) must be applied to the threads of fasteners prior to being fastened to hardware. However, these prior methods can be ineffective because fasteners can easily be lost or dropped when repeatedly being pulled from a bag. Moreover, handling the chemicals can be hazardous to the individual, and can be quite time consuming and cumbersome when applying chemicals to dozens or hundreds of fasteners. There is also a risk of cross contamination of the chemicals after being applied due to the amount of handling that occurs after the chemicals are applied. Therefore, there exists a need for more effective kitting while alleviating the aforementioned problems of applying chemicals to fasteners.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4A illustrates an isometric view of the fastener dispenser magazine of the fastener dispenser tool of FIG. 1A, and showing a fastening tool engaged to a lead fastener in a first position.

FIG. 7B illustrates a cross sectional view of the fastener dispenser magazine of FIG. 7A, and taken along lines 7B-7B.

Figure 1A:
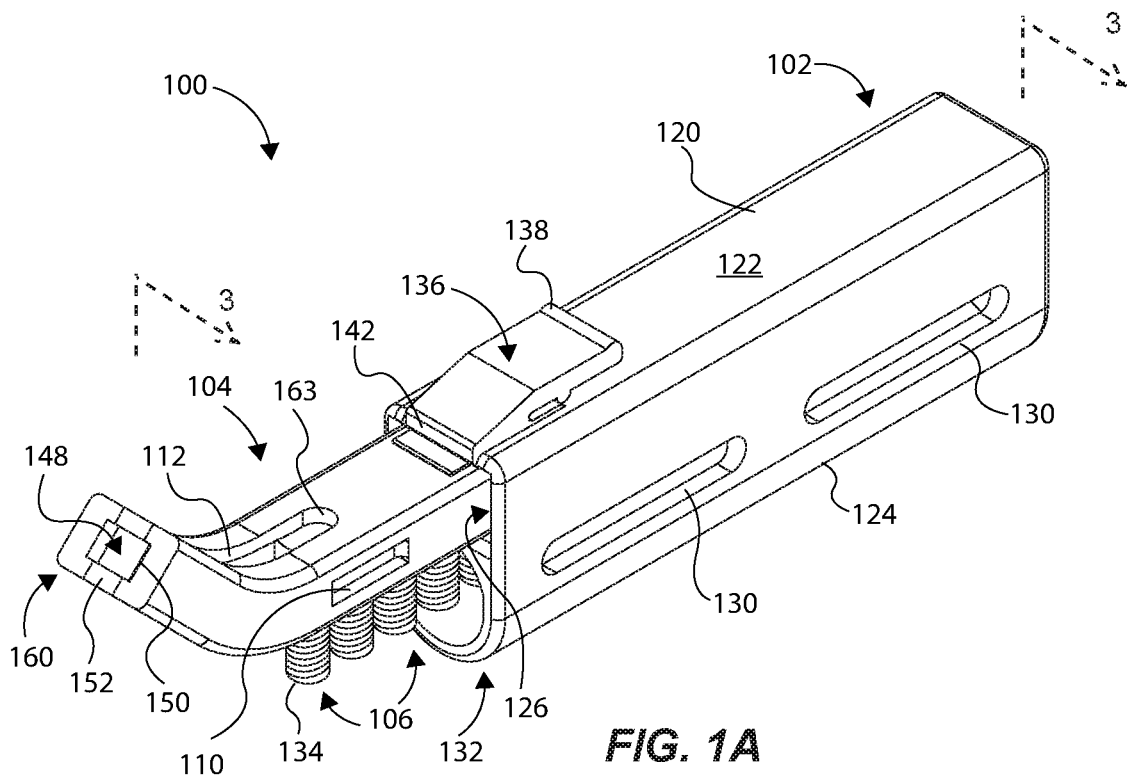
FIG. 1A illustrates an isometric view of a fastener dispenser tool having a fastener dispenser magazine inserted into a support handle in accordance with an example of the present disclosure.
Figure 1B:
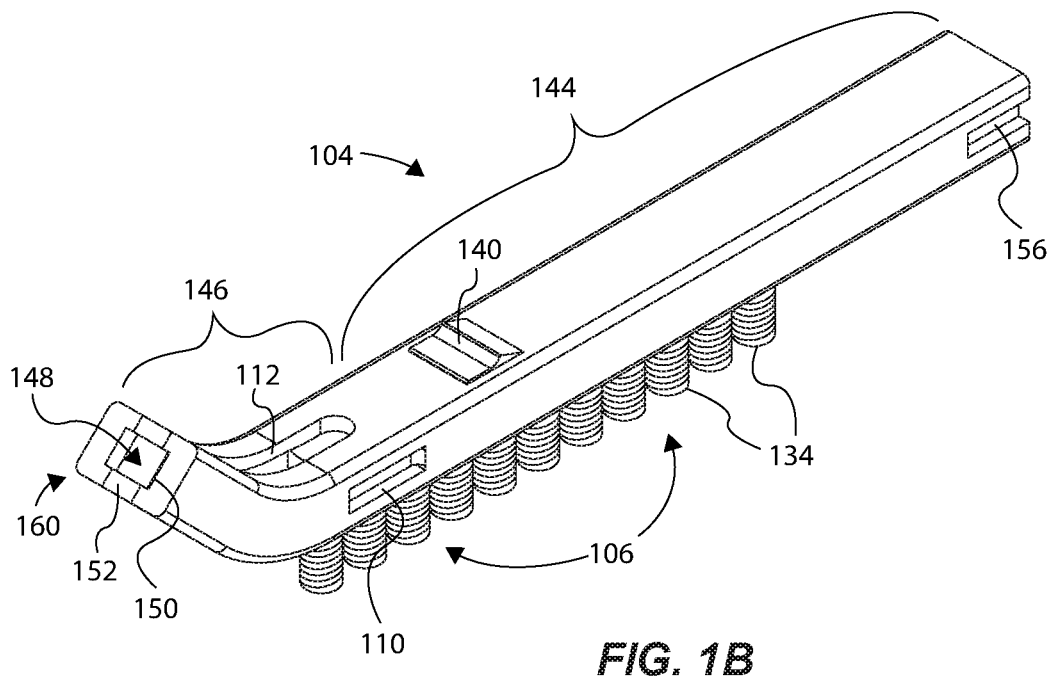
FIG. 1B illustrates an isometric view of the fastener dispenser tool of FIG. 1A, and showing the fastener dispenser magazine removed from the support handle.
Figure 2A:
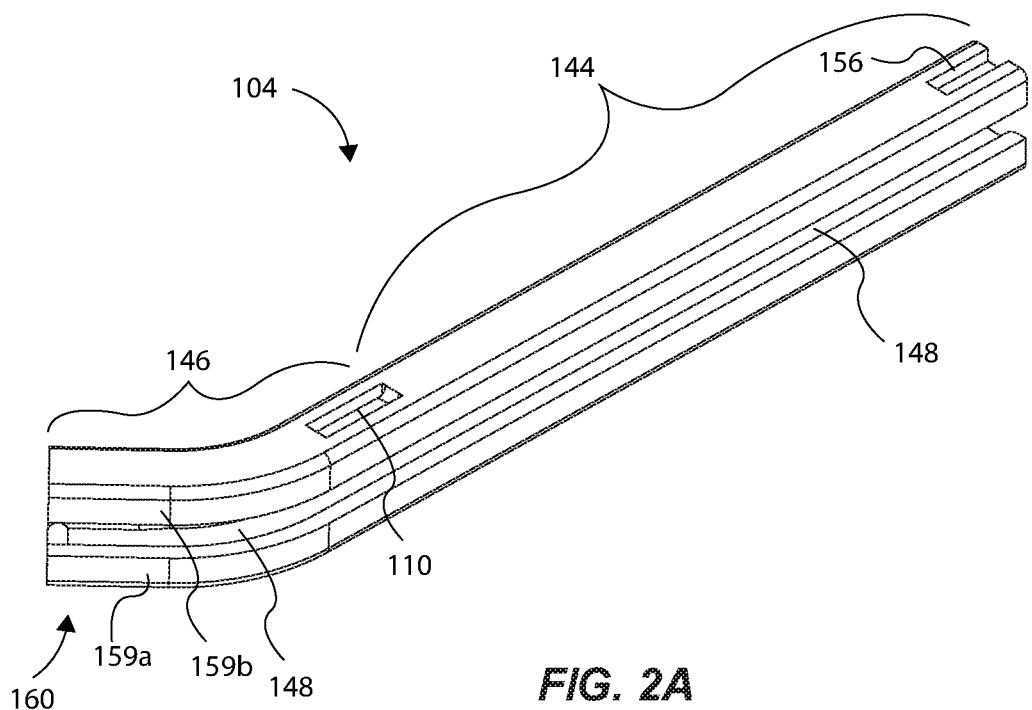
FIG. 2A illustrates an isometric view of the fastener dispenser magazine of FIG. 1B, and without fasteners.
Figure 2B:
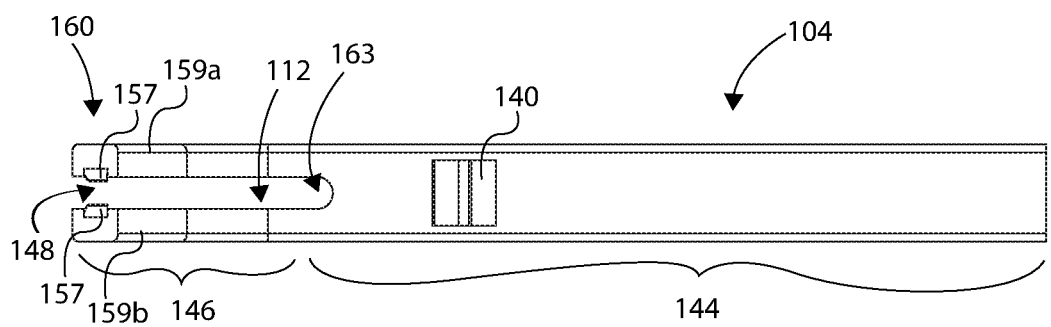
FIG. 2B illustrates top view of the fastener dispenser magazine of FIG. 1B.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a fastener dispenser tool comprising a retention section; a presentation section extending from the retention section; a retention slot extending along the retention section and the presentation section (the retention slot operable to retain a plurality of fasteners); and a presentation slot extending along the presentation section and in open communication with the retention slot. The presentation slot can be sized to receive a tool bit engageable with a lead fastener of the plurality of fasteners, and the retention slot and presentation slot are sized or configured, such that the plurality of fasteners are slidable through the retention slot along the presentation section to facilitate dispensing of the lead fastener (and subsequently others) from the presentation section.

In some examples, fastener dispenser tool can comprise first and second retention devices supported by the retention section for retaining the plurality of fasteners.

In some examples the retention slot defines a first longitudinal axis, and the presentation slot defines a second longitudinal axis that extends transverse the first longitudinal axis.

In some examples, at least a portion of the presentation section comprises a curved profile.

In some examples, the fastener dispenser tool further comprises a support handle configured to be held by an individual, and the retention section and the presentation can define a fastener dispenser magazine. The fastener dispenser magazine can be removably coupleable to the support handle.

The present disclosure sets forth a fastener dispensing system comprising a support handle configured to be held by an individual, and a fastener dispenser magazine removably coupled to the support handle and comprising a retention slot and a presentation slot. A plurality of fasteners can be supported by the retention slot. A fastening tool comprising a tool bit is engageable through the presentation slot with a lead fastener of the plurality of fasteners. The plurality of fasteners are slidable through the retention slot along the presentation section to facilitate dispensing of the lead fastener from the fastener dispenser magazine.

The present disclosure sets forth a method for making a fastener dispenser tool comprising forming a support handle configured to be held by an individual, and forming a fastener dispenser magazine removably coupleable to the support handle. The fastener dispenser magazine can comprise a retention slot for retaining a plurality of fasteners, and a presentation slot sized or configured, such that the plurality of fasteners are slidable through the retention slot along the presentation section to facilitate dispensing of a lead fastener from the fastener dispenser magazine.

To further describe the present technology, examples are now provided with reference to the figures.

FIGS. 1A-3 show various views and aspects of a fastener dispenser tool 100, and FIGS. 4A-4O illustrate a fastener dispensing system 101 and method of using the fastener dispenser tool 100 to dispense a fastener into a structure, in accordance with an example of the present disclosure. As an overview, and with reference to these figures, the fastener dispenser tool 100 can comprise a support handle 102 to be held by an individual (or a robot), and a fastener dispenser magazine 104 removably coupled to the support handle 102. The fastener dispenser magazine 104 can support and retain a plurality of fasteners 106 for dispensing each fastener from the fastener dispenser tool 100 during fastening operations.

Figure 4B:
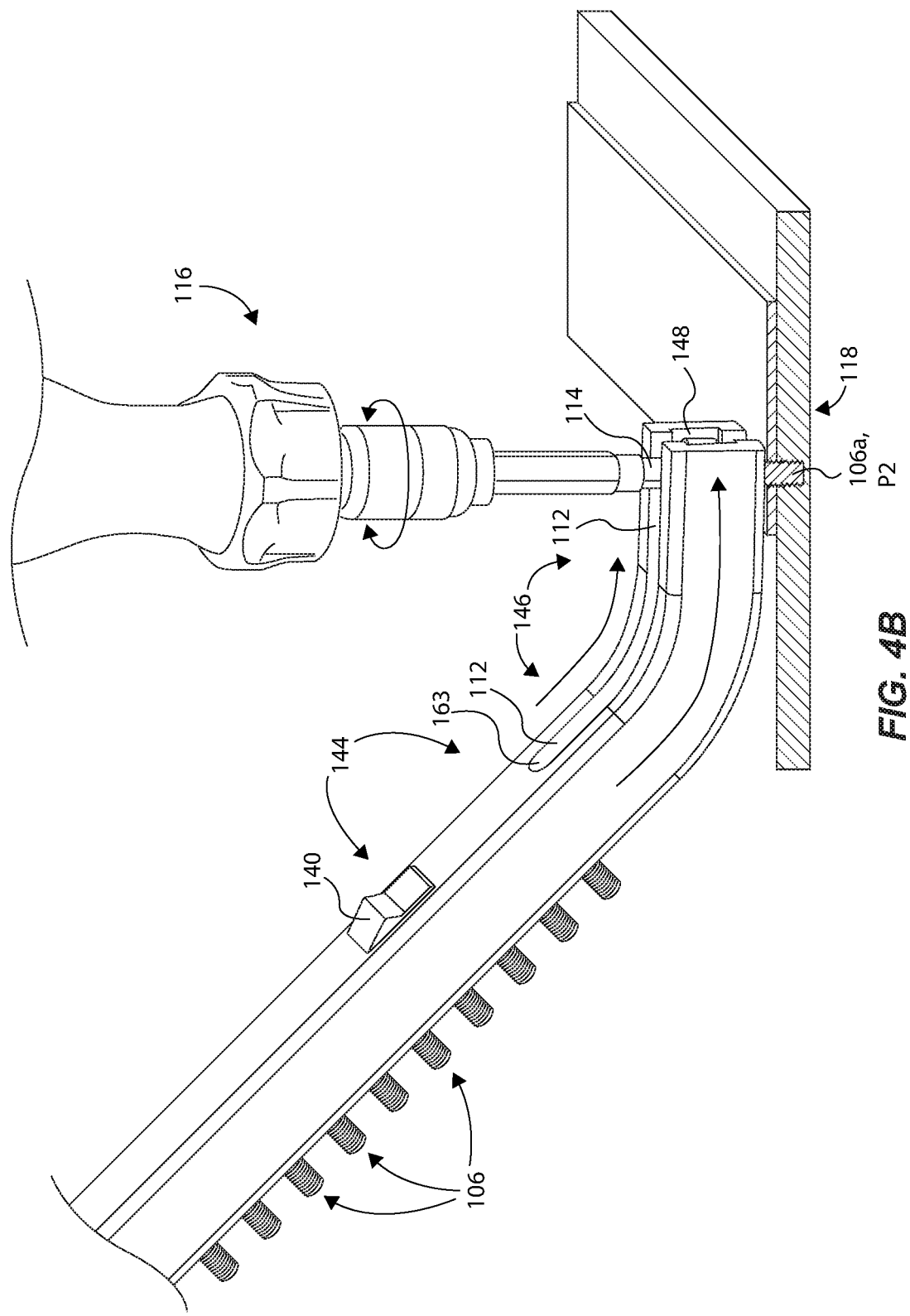
FIG. 4B illustrates an isometric view of the fastener dispenser magazine of the fastener dispenser tool of FIG. 1A, and showing the fastening tool and the lead fastener moved to a second position and engaged to a structure or hardware.

Notably, the fastener dispenser magazine 104 can comprise a dispensing system that comprises a retention device 110 and a presentation slot 112 for presenting a lead fastener 106a to be engaged by a tool bit 114 of a fastening tool 116, as illustrated in FIG. 4A. Thus, the retention device 110 retains the lead fastener 106a (and the other fasteners 106) with a sufficient force to retain the lead fastener 106a. However, the retention device 110 is compliant enough to allow an individual (holding the fastening tool 116) to overcome the force of the retention device 110 by sliding the lead fastener 106a along the fastener dispenser magazine 104, thus elastically deforming or displacing the retention device 110 to facilitate the lead fastener 106a being dispensed and engaged with (i.e., fastened to) a structure 118 (and/or for dispensing the lead fastener 106a by hand), as further detailed below. Therefore, the dispensing system provides an individual with the ability to engage and move a lead fastener away from a plurality of still retained fasteners to a dispensing position (FIG. 4B). This provides one advantage of fastening the lead fastener 106a to the structure 118 in a position away from the remaining, still retained fasteners 106 held by the fastener dispenser magazine 104 for the purpose of providing sufficient clearance of the remaining, still retained fasteners 106 away from the structure 118 for effective fastening of the lead fastener 106a to the structure 118. In other words, the lead fastener 106a can be spatially separated from the next adjacent fastener and all others that are still retained by the retention device 110, such that these do not interfere with the lead fastener 106a as it is being dispensed.

Figure 3:
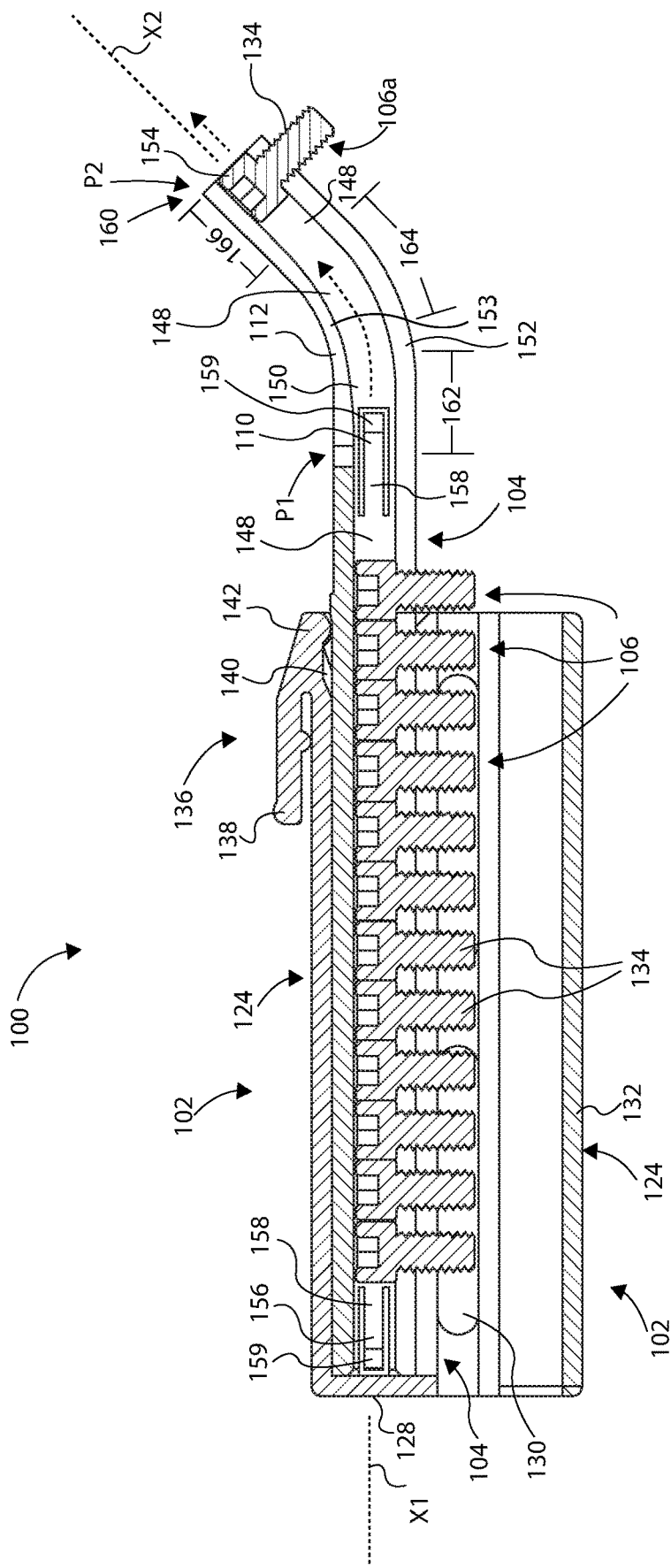
FIG. 3 illustrates a cross sectional view of the fastener dispenser tool of FIG. 1A, and taken along lines 3-3 of FIG. 1A, and having a lead fastener at a tip of the fastener dispenser magazine.

The support handle 102 of the fastener dispenser tool 100 can comprise an elongate body 120 having a planar surface portion 122 and a handle portion 124 that define an outer perimeter surface area of the elongate body 120. The elongate body 120 can comprise a magazine holder opening 126 sized and configured to receive a section or portion of the fastener dispenser magazine 104. As illustrated in FIG. 3, the elongate body 120 can comprise a stop wall portion 128 that assists to stop or hold the fastener dispenser magazine 104 about the support handle 102. The elongate body 120 can further comprise viewing slots 130 formed through the handle portion 124 for viewing the plurality of fasteners 106 retained by the fastener dispenser magazine 104, which is advantageous for counting and inspection of the fasteners 106 without handling them individually.

The handle portion 124 can comprise a thread protection portion 132 that surrounds or wraps at least partially around (e.g., 180 degrees) from side to side and around threaded ends 134 of the plurality of fasteners 106. Notably, the thread protection portion 132 protects the threaded ends 134 from external contact by anyone or anything. This can be advantageous, such as when the threaded ends 134 have chemicals (e.g., thread locker) applied thereon, thereby preventing cross contamination of the chemicals from accidental touching by anyone or anything. Therefore, the individual does not need to touch the fasteners to count and inspect the fasteners, because they can be viewed and counted through the viewing slots 130, and the threads are protected from cross contamination of chemicals applied thereon because the thread protection portion 132 covers and protects the threads.

The support handle 102 can further comprise a magazine retention device 136 for removably coupling the fastener dispenser magazine 104 to the support handle 102. The magazine retention device 136 can be provided on the opposite end of the support handle 102 relative the stop wall portion 128, and can comprise a compliant tab release 138 operable by an individual's thumb, for example, to release a compression force applied to a lock protrusion 140 of the fastener dispenser magazine 104 to remove the fastener dispenser magazine 104 from the support handle 102. Thus, when being inserted in the support handle 102, the fastener dispenser magazine 104 can snap or lock into place via the lock protrusion 140 that engages with a lock portion 142 of the compliant tab release 138 to releasably lock the fastener dispenser magazine 104 to the support handle 102.

The fastener dispenser magazine 104 can comprise a retention section 144 and a presentation section 146 extending from the retention section 144. The retention section 144 can be an elongate body having a generally square or rectangular cross-sectional shape (other cross-sectional shapes or configurations are contemplated herein). The fastener dispenser magazine 104 can comprise a retention track or slot 148 formed therethrough along its length for supporting and retaining the plurality of fasteners 106. The retention slot 148 can extend along the retention section 144 and the presentation section 146 of the fastener dispenser magazine 104, and can comprise a head retention portion 150 (which is shown as being configured as a channel through the fastener dispenser magazine 104) and a shaft pass-through portion 152 (which is shown as being an elongate slot formed through the bottom of the fastener dispenser magazine 104 into the head retention portion 150, which defines an opening or pass-through into the head retention portion 150) (see FIGS. 1A-2A). The head retention portion 150 comprises wall portions sized and configured to receive and support the heads 154 (FIG. 3) of the plurality of fasteners 106, and whereby the shaft pass-through portion 152, which is smaller than the head retention portion 150, is sized and configured to receive and pass-through the smaller ends 134 of the plurality of fasteners 106 (e.g., the at least partially threaded shafts of the fasteners 106). In this manner, the ends 134 can extend out and away from the fastener dispenser magazine 104 in a linear array. With the ends 134 exposed, they are prepared to receive one or more treatments, such as the treatment of chemicals while the user holds the fastener dispenser magazine 104 (i.e., and not the fasteners themselves). Therefore, chemicals can be applied to the threaded ends 134 of the fasteners 106 all at the same time while being held captive in the fastener dispenser magazine 104. This can drastically reduce the time and complexity of applying chemicals to fasteners individually. In this position, they can further be inspected and/or counted.

In one example, the fastener dispenser magazine 104 can comprise another retention device 156 formed or provided about an end of the retention section 144 for retaining the plurality of fasteners 106 (i.e., in cooperation with the retention device 110). The retention devices 110 and 156 can be formed integrally with the fastener dispenser magazine 104 in the form of slotted compliant tabs, as shown, that each have a compliant shaft 158 and a retention protrusion 159 formed inwardly toward the retention slot 148 for retaining the heads of end fasteners situated on either end of the array of fasteners 106 held in the retention section 144. In some examples, as exemplified only in FIG. 2B, the fastener dispenser magazine 104 can comprise opposing retention devices 141 formed at (or proximate) the dispensing tip 160, and supported by the retention slot 148 (e.g., formed as part of the fastener dispenser magazine 104). Thus, the opposing retention devices 157 can be protrusions (e.g., hemispherical shaped) or other shapes/features formed inwardly that reduce a cross sectional area of the retention slot 148, such that the opposing retention devices 157 can stop the lead fastener 106 from accidentally falling out of the fastener dispenser magazine 104. In this manner, the user can position the lead fastener 106a in the presentation position (discussed below), and then apply sufficient force to the lead fastener 106a to outwardly flex sides/jaws 159a and 159b of the fastener dispenser magazine 104 proximate the dispensing tip 160, thereby passing the lead fastener 106a beyond the opposing retention devices 157 and releasing the lead fastener 106a from the fastener dispenser magazine 104, as further detailed below. Thus, the inward height of each opposing retention device 157, as well as the length and thickness of the sides/jaws 159a and 159b of the presentation section 146, are shaped and sized to provide sufficient flexibility and retention of the lead fastener 106a so that it will not fall out, but that can be overcome with sufficient force (e.g., 0.5 pounds) by a user to dispense it therefrom. In another example, the opposing retention devices can instead be another mechanism, such as a ball detent or spring steel tab, each of which reduce the cross sectional area of the end of the retention slot 148, but that are compliant enough to allow a user to pass the lead fastener 106a therefrom. Such concept of the opposing retention devices 157 can be applied to other examples discussed herein, such as in FIGS. 5 and 6 detailed below.

In the examples of retention devices (i.e., 110, 156, and 157) being formed integral, or as part of, the fastener dispenser magazine 104, this reduces or eliminates the likelihood of FOD, because such integral retention devices are less likely to fall or break off from the fastener dispenser magazine 104 because they are not separate components attached to a body of the fastener dispenser magazine 104. Further to this concept, such integral retention devices can be recessed into sides of the fastener dispenser magazine 104 (or within a profile/envelope defined by the fastener dispenser magazine 104), such that no portion of such integral retention devices extend outwardly from a side surface of the fastener dispenser magazine 104. This further reduces or eliminates the likelihood that the retention devices would get snagged on an object, and possibly break off from the fastener dispenser magazine 104 (thereby generating the undesirable FOD).

In another example, the retention devices 110 and 156 can be separate parts or mechanisms coupled to the fastener dispenser magazine 104, such as compliant pins, threaded bolts, or other retention means.

The fastener dispenser magazine 104 and the support handle 102 can be formed by 3D printing, molding, extrusion, casting, or other suitable methods of manufacturing, and can be comprised of a rigid material, such as many plastics, polymers, composites, and metals. The fasteners 106 can be any type, size or shape capable of being supported by the retention slot 148, and can be metal, plastic, composite, etc.

As best shown in FIG. 3, the presentation slot 112 can be formed on another, opposing side of the fastener dispenser magazine 104 (e.g., along a top surface), and can extend along the presentation section 146, and in some cases at least part way into the retention section 144. Thus, the presentation slot 112 and the retention slot 148 can be in open or fluid communication with each other and the head retention portion 150 about or through a dispensing tip 160 of the fastener dispenser magazine 104. In this manner, each of the plurality of fasteners 106 can be freely dispensed out through the dispensing tip 160, as illustrated in FIG. 40 (of course, after being passed beyond the retention device 110). Thus, the fasteners 106 can be loaded into the fastener dispenser magazine 104 through the dispensing tip 160, such that their heads are captured by the head retention portion 150 and their shafts are caused to be within and extend through the retention slot 148. Once inserted, the fasteners 106 can be caused to pass along the presentation section 146, then pressed passed the retention device 110, and then retained in the retention section 144 to be ready for use/dispensing. Alternatively, the fasteners 106 can be loaded into the fastener dispenser magazine 104 in the opposite/back end, and pressed passed the retention device 156, and then retained in the retention section 144 to be ready for use/dispensing.

It is noted that those skilled in the art will recognize that the retention slot 148 can comprise a nonlinear configuration, or in other words, can define or traverse a nonlinear path. Still further, those skilled in the art will recognize that the fastener dispenser magazine 104 can comprise two or more retention slots that extend along the retention section 144 and the presentation section 146 that each facilitate the retaining and dispensing of fasteners in a similar manner as the retention slot 148 discussed above. Alternatively, the fastener dispenser magazine 104 can comprise two retention slot portions that merge into a single retention slot portion at or within the presentation section 146 just beyond a retention device in each of the two retention slot portions. In these examples, the fastener dispenser magazine 104 can be configured to hold a greater number of fasteners.

The presentation section 146 can comprise a proximal linear portion 162 that extends to or that transitions into a curved profile portion 164, and that extends to a distal linear portion 166 (see e.g., FIGS. 3 and 4A). Thus, a portion of the presentation section 146 extends along a plane transverse relative to a plane of the retention section 144, such that the retention slot 148 and the presentation slot 112 are curved proximate the curved profile portion 164. Said another way, and as illustrated in FIG. 3, the retention slot 148 can define a first longitudinal axis X1 that extends centrally through the head retention portion 150, and the presentation slot 112 can define a second longitudinal axis X2 that extends through an end linear section 151 of the presentation slot 112. Thus, the first longitudinal axis X1 extends transverse at an angle relative to the second longitudinal axis X2. The degree of angle can vary, such as from 5 degrees up to 80 degrees, depending on the desired amount of clearance required for a particular application. In addition, the radius of curvature of the curved profile portion 164 can be any as needed or desired to facilitate a nonbinding transition of a fastener along the retention slot 148 from the retention section 144 to the presentation section 146.

The curved profile portion 164 of the fastener dispenser magazine 104 can comprise upper wall sections 153 (one labeled on FIG. 3) that have a smaller or thinner cross sectional profile than that of adjacent wall sections of the proximal linear portion 162 and the distal linear portion 166. These thinner walls of the upper wall sections 153 increases the size of the retention slot 148 along the curved profile portion 164, which allows the fasteners 106 (e.g., box screw heads shown) to make the turn without binding or seizing in the retention slot 148. It will be appreciated that other fastener types, such as flat head screws, may not require such thinner wall sections. This concept of the "thinner" upper wall sections 153 can be applied to other examples discussed herein, such as with the fastener dispenser magazines of FIGS. 5 and 7A detailed below.

Figure 4C:
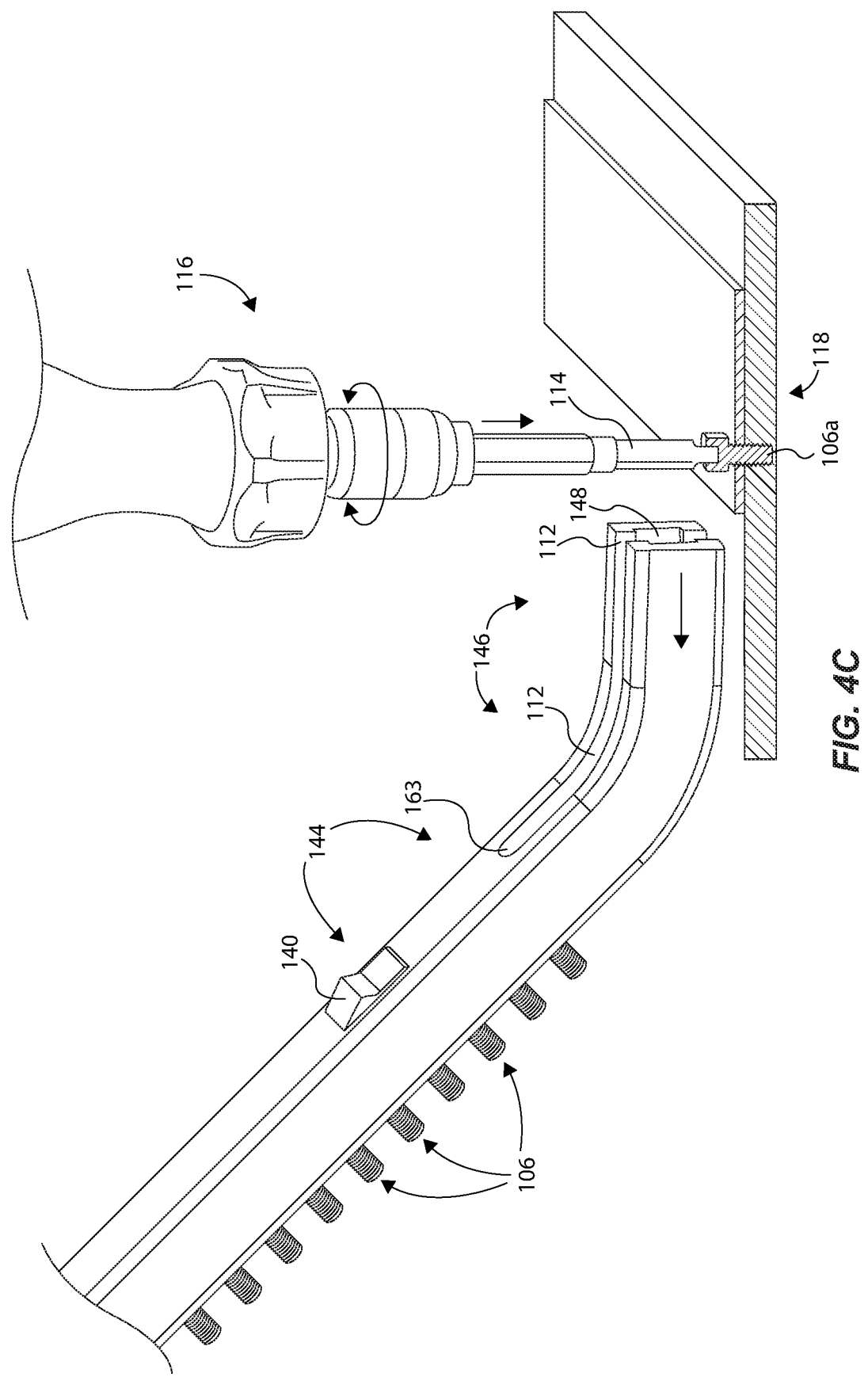
FIG. 4C illustrates an isometric view of the fastener dispenser magazine of the fastener dispenser tool of FIG. 1A, and showing the lead fastener dispensed from the fastener dispenser tool and fastened to the structure.

With particular reference to FIGS. 4A-4C, in operation, an individual can grasp the support handle 102 with one hand (or just grasp the fastener dispenser magazine 104), and then with the other hand can grasp the fastening tool 116, and extend the tool bit 114 through an engagement opening portion 163 (an end) of the presentation slot 112 to engage the lead fastener 106a in a first or presentation position P1, which is behind the retention device 110, as illustrated in FIG. 4A. In one example, the tool bit 114 can be a hex tool bit that engages a type of fastener having a hex head. The lead fastener 106a can be held in the presentation position P1 by the retention device 110 proximate the engagement opening portion 163. Then, using the fastening tool 116, the individual can apply a force (laterally away from the other fasteners 106) to the lead fastener 106a having a tendency to cause the lead fastener 106a to slide within the retention slot 148, to overcome the compression or friction force applied by the retention device 110, thereby displacing the retention device 110 (compliantly or elastically) so as to move the lead fastener 106a past, and to release the lead fastener 106a from, the retention device 110. Being free from the retention device 110, the individual can then freely slide the lead fastener 106a further through the retention slot 148 and from the retention section 144 to and along the presentation section 146 to the dispensing position P2 as shown in FIG. 4B. This may require the individual to manipulate the fastener dispenser tool 100 and the fastening tool 116 to appropriately traverse the lead fastener 106a through retention slot 148 about the presentation section 146. Once in the dispensing position P2 shown in FIG. 4B, the individual may initiate engagement of the lead fastener 106a with the structure 118. In one example, the lead fastener 106a can comprise threads, and the structure 118 can comprise one or more hardware components to be fastened together via threaded holes, as shown. Other engagement interfaces, other than a threaded interface, are contemplated. Once the lead fastener 106a is initially engaged with the structure 118, the individual may then pull the fastening dispenser tool 100 away from the lead fastener 106a, such that the lead fastener 106a is released and freed from the fastener dispenser magazine 104 via the dispensing tip 160, as illustrated in FIG. 4C. The individual may then finish threadably coupling the lead fastener 106a to the structure 118 via the fastening tool 116 to complete the fastening operation. This operation can be repeated as often as necessary for the remaining fasteners retained within the fastener dispenser tool 100. Indeed, the fastener dispenser magazine 104 is then ready for another fastener operation, because a new lead fastener can be caused to be proximate the retention device 110. In one aspect, the fasteners can move within the retention slot 148 under the influence of gravity feeding down the fasteners 106 into the first position P1. In another aspect, a biasing component, such as a spring, can be supported within the fastener dispenser magazine 104 and caused to exert a biasing force on the array of retained fasteners, wherein the biasing force acts upon the array of fasteners to move the next successive lead fastener into the position P1 against the retention device 110. In another example, a fastening tool may not be used with the fastener dispenser magazine 104, because the individual may just pull out one fastener at a time from the fastener dispenser magazine 104 by hand, and then later use a fastening tool to attach the fastener to a structure.

As best illustrated in FIG. 4B, when being installed, the lead fastener 106a is spatially separated away from the other fasteners retained in the retention section 144 behind and via the retention device 110. This provides a certain amount of clearance or separation for the lead fastener 106a to engage the structure 118 away from the other fasteners 106. This spatial gap can be any length desired or needed. In this way, the curved profile portion 164 positions the support handle 102, the retention section 144, and the remaining fasteners 106 upwardly and at an angle or position away from the lead fastener 106a when in the dispensing position P2 and being installed. This is advantageous as the other fasteners 106 (and the support handle 102) may otherwise contact or interfere with the structure 118, which could prevent or make difficult the fastening of the lead fastener 106a to the structure 118.

Advantageously, the fastening tool 116 is unattached to the support handle 102 or the fastener dispenser magazine 104, which reduces the complexity of the system. This provides a more portable fastening dispenser tool because it is unattached to a fastening tool, and it can be disposable due to its simplicity and low cost of manufacture. Therefore, a particular fastener dispenser tool of the present disclose can be inexpensively manufactured, and in some cases, pre-loaded with a desired number of fasteners, and then shipped for use at another location. Then, the support handle and/or the fastener dispenser magazine can be disposed of after the fasteners are dispensed and installed on a piece of hardware. The fastener dispenser tool of the present disclosure can be useful for providing fastener dispensing tools that are kitted with a certain type and specific number of fasteners, thus aiding users in maintaining awareness of the number of fasteners used, and the number remaining, as well as to provide an efficient way to package and to keep track of the fasteners.

Further advantageously, the plurality of fasteners 106 are unattached to each other (but abutted next to each other) when retained by the fastener dispenser tool. This eliminates the need for plastic/polymer attachment strips used to attach an array of fasteners. Such strips used in prior system attach the fasteners together and then break apart upon dispensing each fastener, leaving plastic/polymer debris (FOD) in the surrounding area. This is quite problematic in certain environments that cannot have such debris/FOD, such as in clean rooms, and other facilities involving aerospace manufacturing, space vehicle assembly, electronics assembly, and many other facilities that have strict FOD processes and kitting requirements.

Figure 5:
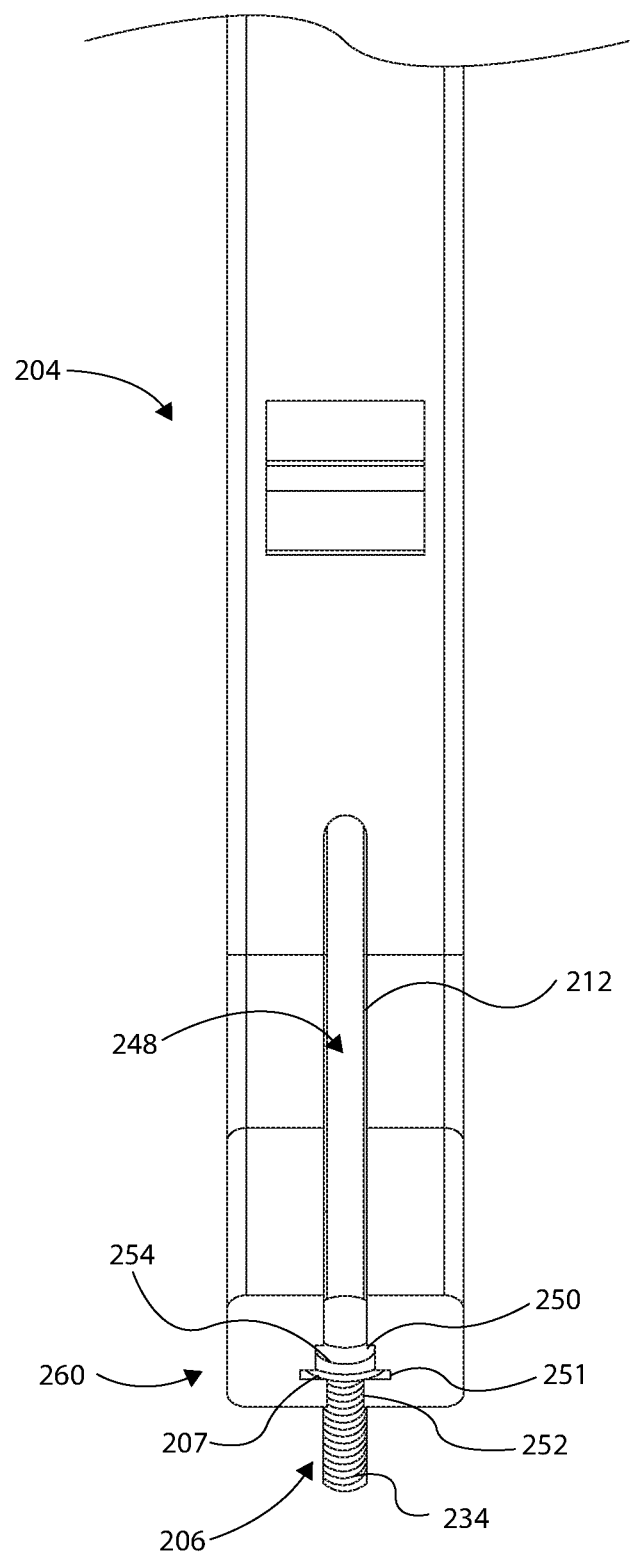
FIG. 5 illustrates a partial top perspective view of a fastener dispenser magazine having a fastener and a washer positioned at a tip of the fastener dispenser magazine in accordance with an example of the present disclosure.

FIG. 5 illustrates a fastener dispenser magazine 204 in accordance with an example of the present disclosure. The fastener dispenser magazine 204 can have many of the same or similar features as described above regarding the fastener dispenser magazine 104, and can be inserted into the handle 102 in FIG. 1A. Notably, one difference is that a retention slot 248 of the fastener dispenser magazine 204 can be configured to support and retain a plurality of fasteners and associated washers, as illustrated by a lead fastener 206 and a washer 207 supported about a dispensing tip 260 of the fastener dispenser magazine 204. Thus, the retention slot 248 can comprise a head retention portion 250, a washer retention portion 251, and a shaft pass-through portion 252, all in fluid communication with each other, and also with a presentation slot (which can be configured to operate similarly as the presentation slot 112 of FIGS. 1A-4O). Thus, the head retention portion 250 is sized to receive and support heads 254 of the fastener 206, and the washer retention portion 251 is sized to receive the washer 207 (or two or more washers), while the shaft pass-through portion 252 is sized to receive and pass-through the threaded ends 234 of the fastener 206. Such configuration provides the advantage of kitting a set of fasteners and washers, which reduces or eliminates the likelihood of the fasteners and washers becoming FOD in a particular piece of hardware. This also reduces the amount of handling of the fasteners and washers, particularly after the threads of the fasteners have been chemically treated.

Figure 6:
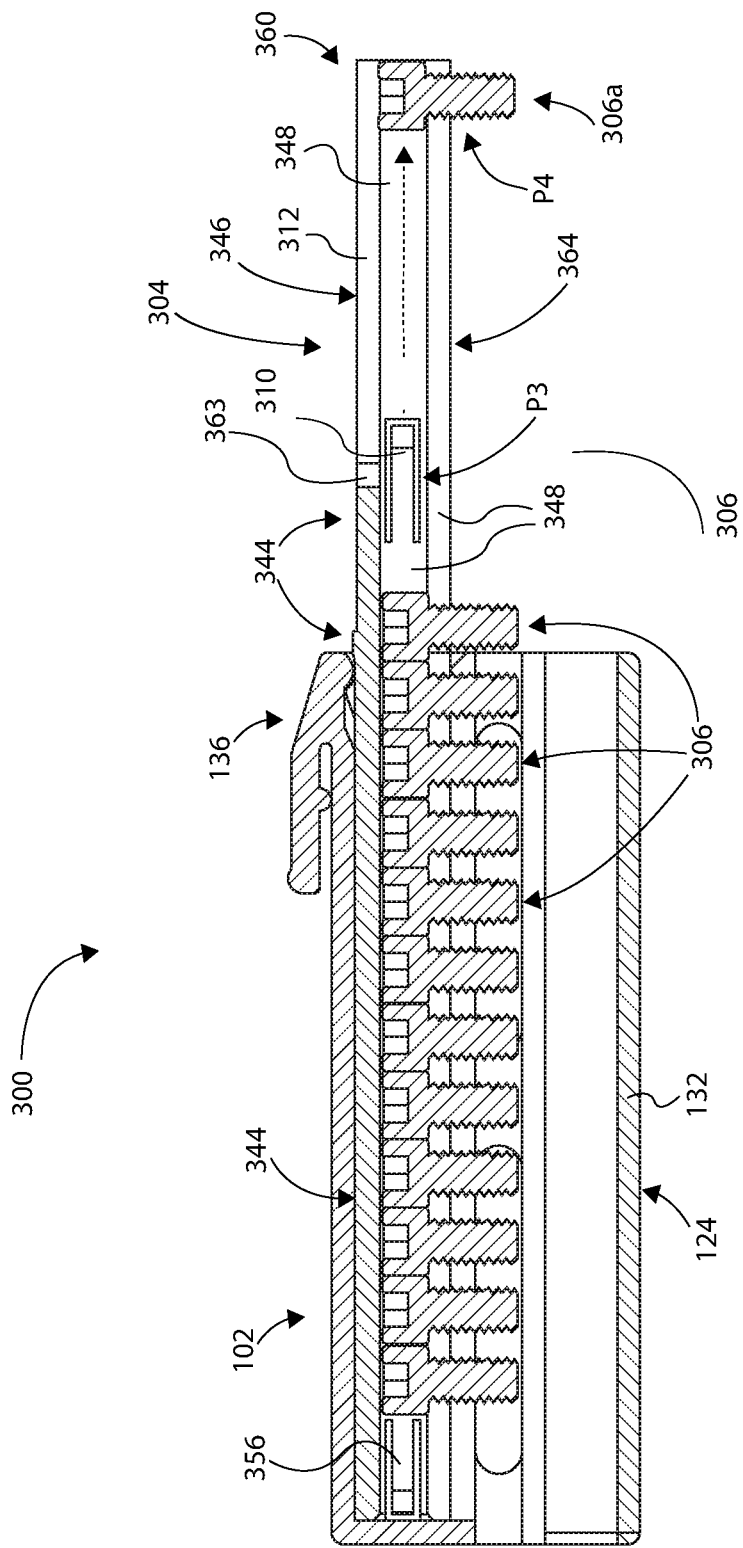
FIG. 6 illustrates a cross sectional view a fastener dispenser tool in accordance with an example of the present disclosure.

FIG. 6 shows a fastener dispenser tool 300 in accordance with an example of the present disclosure. The fastener dispenser tool 300 can comprise many of the same or similar features as the fastener dispenser tool 100 describe above. One notable difference is that a fastener dispenser magazine 304 of the fastener dispenser tool 300 comprises a linear dispensing configuration, as opposed to the curved dispensing configuration described regarding FIGS. 1A-4C. Note that the fastener dispenser tool 300 can include or comprise the support handle 102 as described above regarding FIG. 1A. Thus, the support handle 102 can receive and support the fastener dispenser magazine 304 of FIG. 6. Accordingly, the support handle 102 can be universal for different types of fastener dispenser magazines.

More specifically, the fastener dispenser magazine 304 can support and retain a plurality of fasteners 306 for dispensing each fastener from the fastener dispenser magazine 304. The fastener dispenser magazine 304 can comprise a dispensing system that comprises a retention device 310 and a presentation slot 312 for presenting a lead fastener 306a to be engaged by a tool bit (e.g., 114) of a fastening tool (e.g., 116), similarly as shown in FIG. 4A. Thus, the retention device 310 applies a sufficient force to retain the lead fastener 306a, but is compliant enough to allow an individual (holding the fastening tool) to slide the lead fastener 306a along the fastener dispenser magazine 304 for engaging with a structure (e.g., 118) (and/or for dispensing the lead fastener 306a), as further detailed below. Therefore, the dispensing system provides an individual with the ability to engage and move a lead fastener away from a plurality of retained fasteners to a dispensing position, which provides the advantage of fastening the lead fastener to a structure away from the remaining and still retained fasteners for purposes of providing sufficient clearance of the remaining, and still retained, fasteners from the structure.

The fastener dispenser magazine 304 can comprise a retention section 344 and a presentation section 346 extending from the retention section 344, and which define a generally rectangular, straight elongate body from end to end of the fastener dispenser magazine 304. The fastener dispenser magazine 304 can comprise a retention track or slot 348 formed through the length of the fastener dispenser magazine 304 along the retention section 344 and the presentation section 346 for supporting and retaining the plurality of fasteners 306 about the retention section 344 and for presenting a fastener for dispensing at the presentation section 346. The retention slot 348 can be similarly formed and configured as the retention slot 148 described above.

The fastener dispenser magazine 304 can comprise another retention device 356 formed or provided on the end of the retention section 344 for retaining the plurality of fasteners 306, and in cooperation with the retention device 310 formed or provided adjacent the presentation slot 312. The retention devices 310 and 356 can be formed and configured similarly as described above regarding retention devices 110 and 156.

The presentation slot 312 can be formed on the other/opposing side of the fastener dispenser magazine 304 in a similar manner as discussed above with respect to the presentation slot 112 shown in FIGS. 1A-4C. indeed, the presentation slot 312 can extend along the presentation section 346. Thus, the presentation slot 312 and the retention slot 348 are in open or fluid communication with each other, and extend to and through to a dispensing tip 360 of the fastener dispenser magazine 304. In this way, the plurality of fasteners 306 can be freely dispensed out through the dispensing tip 360 (after being passed beyond the retention device 310).

Notably, the retention slot 348 and the presentation slot 312 comprise a linear dispensing configuration, such that there is not a curved or transverse transition portion between the retention section 344 and the presentation section 346. However, this can still allow the lead fastener 306a to be moved from a presentation position P3, and then slid along the retention slot 348 to a dispensing position P4. Thus, similarly as illustrated in FIG. 4A, an individual can grasp the support handle 102 with one hand, and then with the other hand can grasp the fastening tool (e.g., 116) and extend the tool bit (e.g., 114) through an engagement opening portion 363 of the presentation slot 312 to engage the lead fastener 306a. Then, the individual can apply a force laterally away from the other fasteners 306 to slide the lead fastener 306a to overcome the compression or friction force applied by the retention device 310, thereby releasing the lead fastener 306a from the retention device 310. Being free from the retention device 310, the individual can freely (and linearly) slide the lead fastener 306a through the retention slot 348 and along the presentation section 146 in a straight travel path to the dispensing position P4. Once in the dispensing position P4, the individual may initiate engagement of the lead fastener 306a with a structure, and then the individual may pull the fastening dispenser tool 300 away from the lead fastener 306a, such that the lead fastener 306a is freely released from the fastener dispenser magazine 304 via the dispensing tip 360. The individual may then finish coupling the lead fastener 306a to the structure via the fastening tool to complete the fastening operation.

Thus, the lead fastener 306a can be spatially separated away from the other fasteners 306 retained by the retention section 344 via the retention device 310 while the user threads the lead fastener 306a to the structure, which provides clearance for the lead fastener 306a to engage the structure. Further to this principle, the linear profile portion 364 positions the support handle 302, the retention section 344, and the remaining fasteners away from the lead fastener 306a when in the dispensing position P4. This may be useful in applications where the lead fastener 306a is secured to an edge or corner portion of a structure, or in other applications.

FIGS. 7A-7D show aspects of a fastener dispenser tool 400 and a method of using the fastener dispenser tool 400, in accordance with an example of the present disclosure. The fastener dispenser tool 400 can comprise many of the same or similar features as the fastener dispenser tool 100 describe above. One notable difference is that a fastener dispenser magazine 404 of the fastener dispenser tool 400 can comprise a fastener ejection portion 405 for supporting and ejecting a lead fastener 406a orthogonally from the fastener dispenser magazine 404 (i.e., in a different direction than described regarding fastener dispenser magazines 104 and 304 discussed above).

Figure 7A:
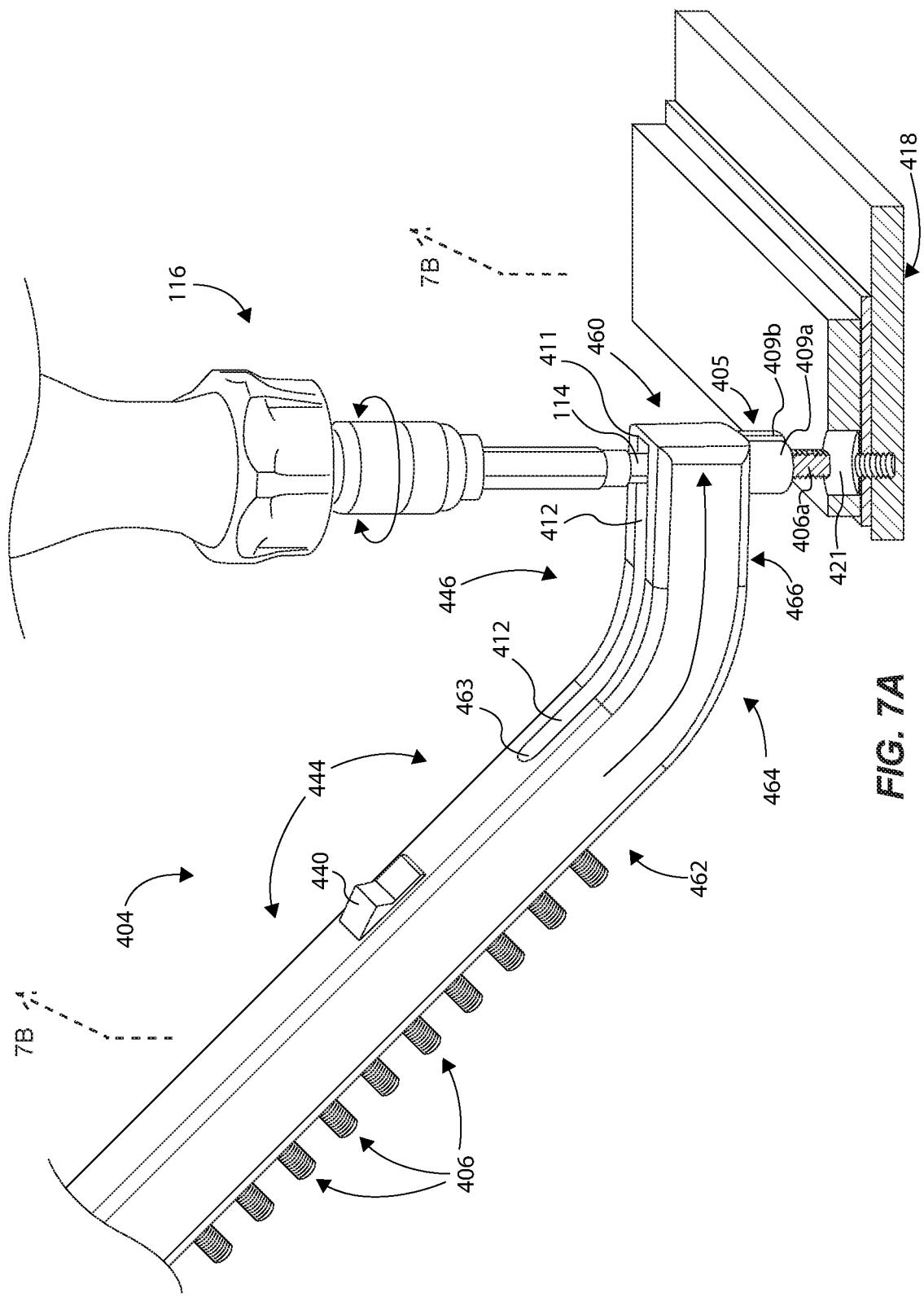
FIG. 7A illustrates an isometric view of a fastener dispenser magazine, and showing a fastening tool engaging a lead fastener for fastening into a structure, in accordance with an example of the present disclosure.
Figure 7C:
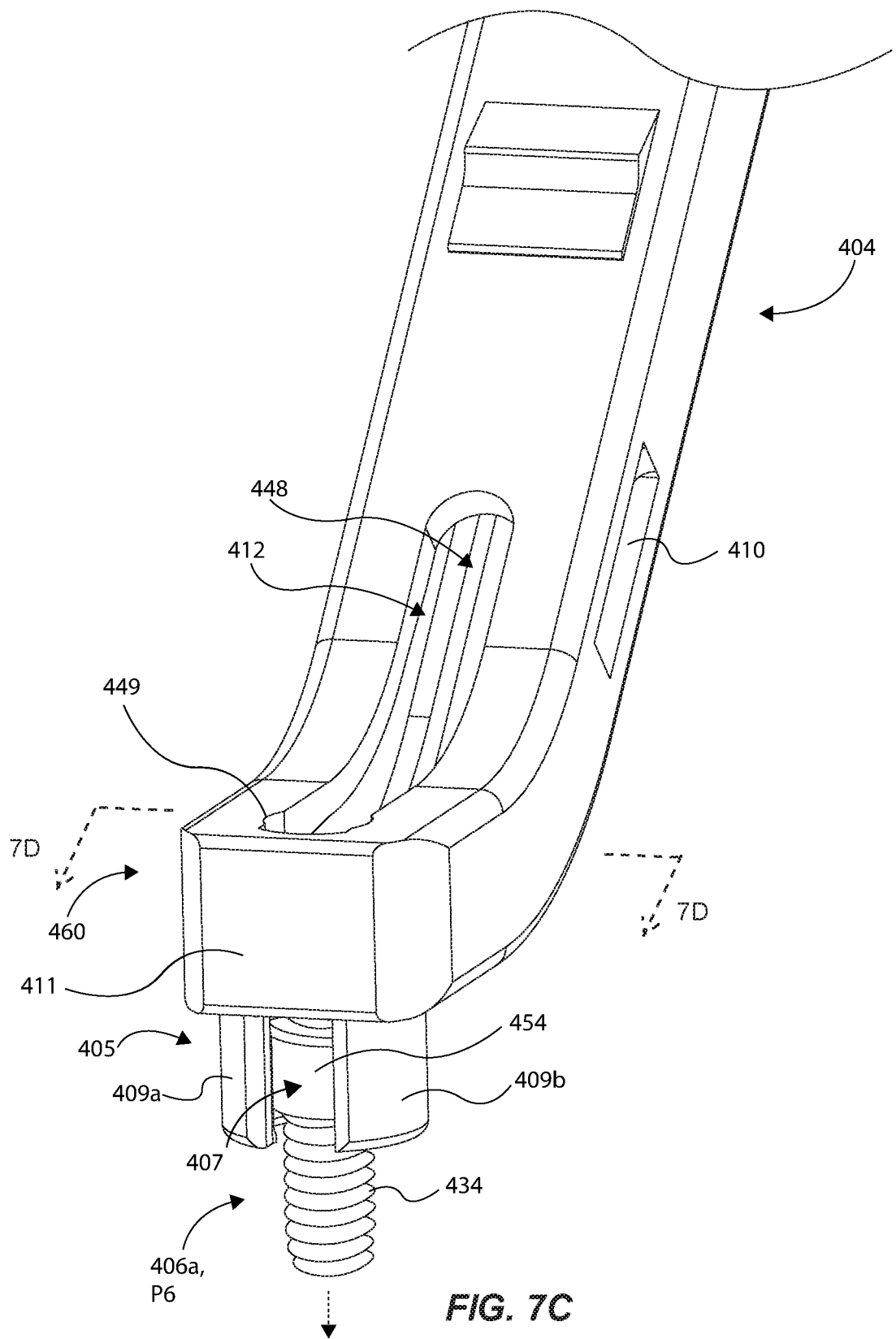
FIG. 7C illustrates an isometric view of an end of the fastener dispenser magazine of FIG. 7A, and supporting the lead fastener for dispensing.
Figure 7D:
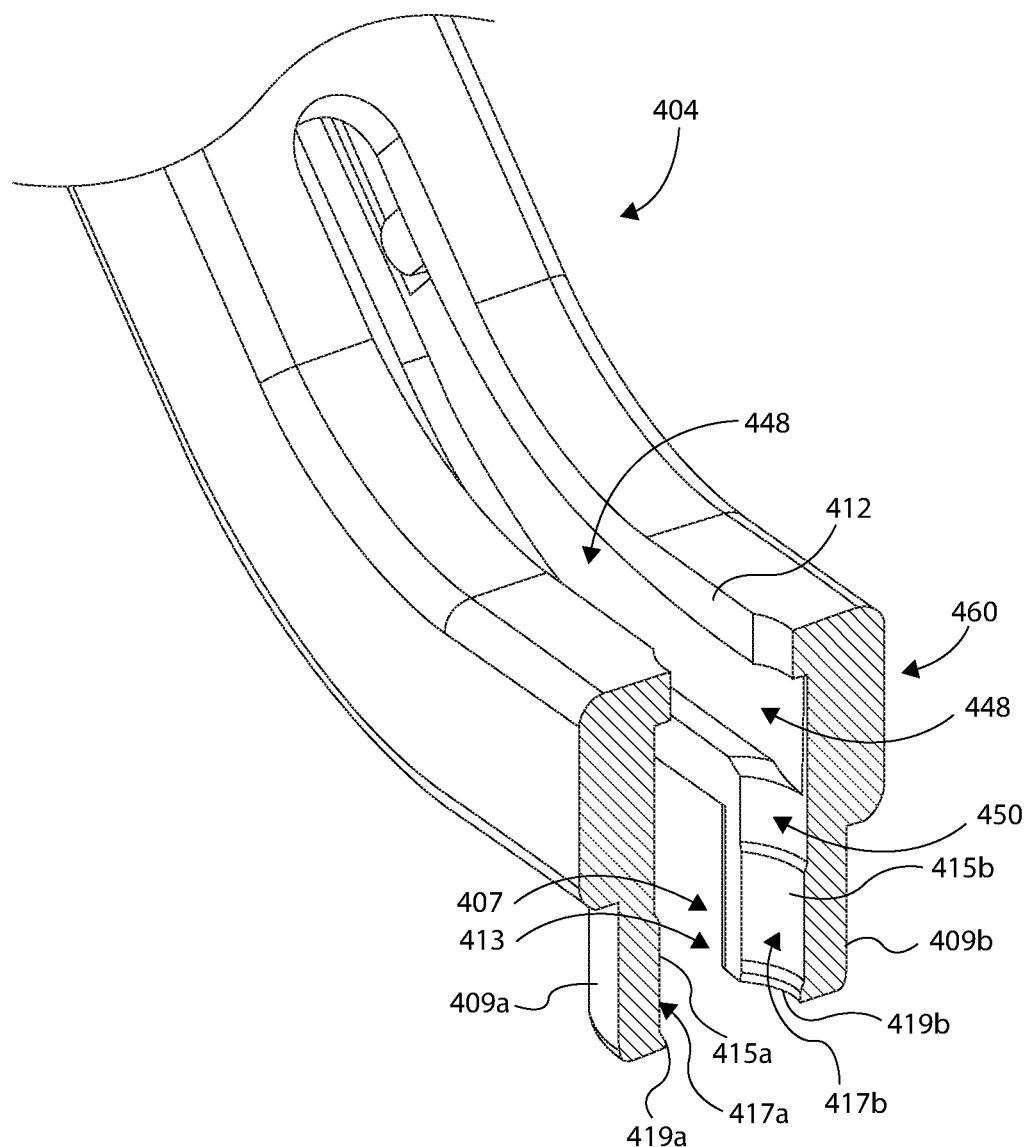
FIG. 7D illustrates a cross sectional view of the end of the fastener dispenser magazine of FIG. 7A, taken along lines 7D-7D of FIG. 7C, and with the lead fastener removed.

More specifically, the fastener dispenser tool 400 can comprise the support handle 102 (FIG. 7B), such as described above regarding FIG. 1A. The support handle 102 can receive and support the fastener dispenser magazine 404. Thus, the support handle 102 can be universal to receive different types of fastener dispenser magazines. However, note that FIG. 7A shows the fastener dispenser magazine 404 removed from the handle 102, and being used in a fastening operation. This illustrates that a support handle may not be necessarily needed or used for a fastening operation, even though such a support handle is still useful for handling and manipulating the fastener dispenser magazines described herein.

The fastener dispenser magazine 404 can support and retain a plurality of fasteners 406 for dispensing each fastener from the fastener dispenser magazine 404. The fastener dispenser magazine 404 can comprise a dispensing system that comprises a retention device 410 (FIG. 7B) and a presentation slot 412 for presenting a lead fastener 406a to be engaged by a tool bit 314 of a fastening tool 316 (FIG. 7A). Thus, the retention device 410 applies a sufficient force to retain the lead fastener 406a, but is compliant enough to allow the lead fastener 406a to be slid along the fastener dispenser magazine 404 and to overcome the retention device 410 to be positioned for engaging with a structure 418, and for dispensing the lead fastener 406a, as further detailed below. Therefore, the dispensing system provides an individual with the ability to engage and move a lead fastener away from a plurality of fasteners to a dispensing position, which provides the advantage of fastening the lead fastener to a structure away from the remaining, still retained fasteners for purposes of providing sufficient clearance of the remaining, still retained fasteners from the structure (e.g., hardware, chassis, circuit board, frame, etc.).

The fastener dispenser magazine 404 can comprise another retention device 456 formed or provided on the end of the retention section 444 for retaining the plurality of fasteners 406, and in cooperation with the retention device 410 formed or provided adjacent the presentation slot 412. The retention devices 410 and 456 can be formed and configured similarly as described above regarding retention devices 110 and 156.

The presentation slot 412 can be formed on the other, opposing side of the fastener dispenser magazine 404 from that of the retention slot 448, and can extend along the presentation section 446. Thus, the presentation slot 412 and the retention slot 448 are in open or fluid communication with each other, and extend to and through to a dispensing tip 460 of the fastener dispenser magazine 404.

The presentation section 446 can comprise a proximal linear portion 462 that extends to a curved profile portion 464, and that extends to a distal linear portion 466 (FIG. 7B). Thus, a portion of the presentation section 446 extends transverse relative to the retention section 444, such that the retention slot 448 and the presentation slot 112 are somewhat curved proximate the curved profile portion 464, similarly as discussed above. This allows the lead fastener 406a to be moved from a presentation position P5, and then slid along the retention slot 448 into the fastener ejection portion 405 to a dispensing position P6. Similarly as described regarding FIGS. 4A-4C, an individual can grasp the support handle 102 with one hand, and then with the other hand can grasp the fastening tool 116 and extend the tool bit 114 through an engagement opening portion 463 of the presentation slot 412 to engage the lead fastener 406a. Here, the lead fastener 406a is in the presentation position P5, as retained by the retention device 410. Then, the individual can apply a force laterally away from the other fasteners 406 to overcome the compression or friction force applied by the retention device 410, thereby releasing the lead fastener 406a from the retention device 410. Being free from the retention device 410, the user can freely slide the lead fastener 406a through the retention slot 448 and along the presentation section 446, down into the fastener ejection portion 405, and to the dispensing position P6 shown in FIGS. 7A and 7B. Once in the P6 position shown in FIG. 7A, the individual may actuate the fastening tool 116 to fasten the lead fastener 406a into the structure 418, thereby dispensing the lead fastener 406a from the fastener dispenser magazine 404.

The fastener ejection portion 405 can extend outwardly from the presentation section 446 proximate the dispensing tip 460. Thus, the fastener ejection portion 405 can be supported about the dispensing end 460, and can be configured to hold in-place or retain the lead fastener 406a while being engaged with (i.e., fastened to) the structure 418. This configuration is useful in applications where the structure that receives the fastener 406*a* may be difficult to reach, such as because of a cavity or counterbore 421 (FIG. 7A), or because of surrounding components that may make it difficult for the individual to fasten the lead fastener to a structure.

With particular reference to FIGS. 70 and 70, the fastener ejection portion 405 can comprise an ejection opening 407 in communication with the retention slot 448, the ejection opening 407 being defined by first and second side walls 409*a* and 409*b* that are formed somewhat as flanges from the dispensing tip 460. The first and second side walls 409*a* and 409*b* can be operable to position and support the lead fastener 406*a* while being fastened to the structure 418. The presentation slot 412 comprises a distal stop portion 411 that terminates above or relative to the ejection opening 407. Thus, the presentation slot 412 is not open or exposed at the dispensing end 460 (as compared to the presentation slot 160 that is open or exposed laterally from the dispensing tip 160 in FIGS. 2B and 40). The distal stop portion 411 can function to position the lead fastener 406*a* along the retention slot 448 in a position to be inserted into the fastener ejection portion 405. Furthermore, the presentation slot 448 can comprise a flared region 449 at its end proximate to or about the distal stop portion 411 that provides clearance for the tool 416, or a bit attached thereto, to pass through as it remains engaged with the lead fastener 406*a* while the lead fastener 406*a* is being moved into and is within the fastener ejection portion 405.

The first and second side walls 409*a* and 409*b* can be formed laterally on either side of the retention slot 448, and can be supported about the bottom of the fastener dispenser magazine 404 in a cantilevered manner, such that the first and second side walls 409*a* and 409*b* can deflect, being made of compliant material. The first and second side walls 409*a* and 409*b* can define a distal retention opening 413 sized to permit passage of the threaded shaft of the lead fastener 406*a*. The first and second side walls 409*a* and 409*b* can each comprise respective curved or radial surfaces 415*a* and 415*b* that cooperate to grip and retain the head of the lead fastener 406*a* once moved into the dispensing position P6 (FIG. 70). In one aspect, the radial surfaces 415*a* and 415*b* can each comprise a raised portion 417*a* and 417*b* that reduces the diameter or area defined by the ejection opening 407 to grip and retain the head of the lead fastener 406*a*. This can properly align the lead fastener 406*a* and reduce or eliminate any "slop" of the lead fastener 406*a* within the fastener ejection portion 405 when being prepared for fastening. Detent portions 419*a* and 419*b* can be formed at the ends of the raised portions 417*a* and 417*b* to further temporarily retain the head of the lead fastener 406*a*. Therefore, such as in the case with a threaded fastener, upon actuating the fastening tool 116 to rotate the lead fastener 406*a*, the threaded shaft will begin engaging with threads in the structure 418, which causes a downward movement and force about the lead fastener 406*a*, which causes the first and second side walls 409*a* and 409*b* to slightly deflect outwardly so that the head can pass over the detent portions 419*a* and 419*b* to be ejected out of the fastener ejection portion 405. Once the fastener 406*a* releases from the fastener ejection portion 405, the side walls 409*a* and 409*b* return to their initial position ready to receive another fastener.

Accordingly, the lead fastener 406*a* can be ejected or dispensed from the bottom of the fastener dispenser magazine 404 (rather than from an end as with the fastener dispenser magazines 104, 204 and 304 discussed above) through the fastener ejection portion 405 in a direction orthogonal relative to the path taken by the lead fastener 406*a* in the retention slot 448 as it is caused to move within the presentation section 446 to the dispensing tip 460. The fastener ejection portion 405 can extend downwardly from a lower or bottom side of the fastener dispenser magazine 404, so that the fastener ejection portion 405 can be positioned into the cavity or counterbore 421, such as illustrated in FIG. 7A, while the lead fastener 406*a* is being fully fastened to the structure 418. Therefore, the lead fastener 406*a* remains supported by the fastener dispenser magazine 404 during complete fastening of the fastener 406*a* to the structure 418, which helps with more precise alignment and threading into tight areas. Compare this to the fastener dispenser magazine 104 that requires removal of the fastener dispenser magazine 104 away from the lead fastener 106*a* before the lead fastener 106*a* can be fully threaded into the structure.

Note that a tunnel section 450 (FIG. 7D) can be sized slightly larger in diameter than the head of the lead fastener to be dispensed, and can be relatively short as shown, or relatively long, such as two inches or more. In such configuration where the tunnel section 450 is relatively long (e.g., 6 inches), the fastener dispenser magazine can be used to install fasteners into difficult to reach areas.

In one example, a fastener ejection portion (e.g., like 405) can be incorporated with the straight or linear fastener dispenser magazine 304 in FIG. 6. Thus, the fastener ejection portion in such an example can be useful because it may eliminate the need to have a curved or bent fastener dispenser magazine, because the fastener ejection portion can extend outwardly away from the lower surface of the fastener dispenser magazine to provide clearance of the other fasteners from the structure.

As should be appreciated from the various examples described regarding FIGS. 1A-7D, the fastener dispenser tools can each be comprises of only two parts: 1) the handle, and 2) the fastener dispenser magazine. This provides the advantage of dramatically reducing FOD because there are less parts (i.e., only 2 parts) that can be lost or broken or dropped in a particular manufacturing facility.

Figure 8:
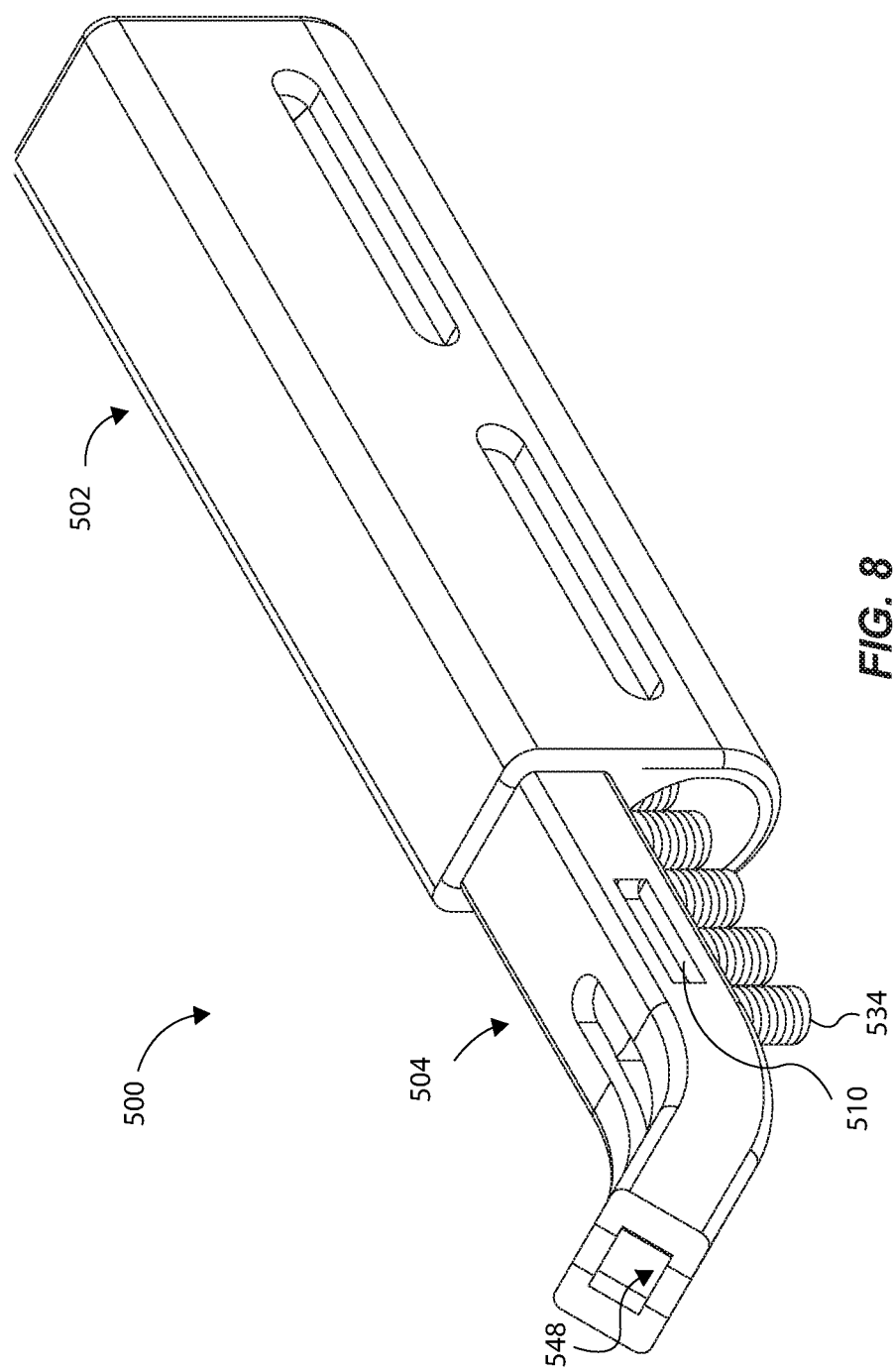
FIG. 8 illustrates an isometric view of a fastener dispenser tool in accordance with an example of the present disclosure.

FIG. 8 illustrates a fastener dispenser tool 500 that includes a handle 502 and a fastener dispenser magazine 504 that are formed integral with each other, which provides one single bodied tool. Thus, the fastener dispenser magazine 504 is not removable, because it is formed as part of the handle 502 as one unitary product. This further promotes the advantage of reducing possible FOD because the fastener dispenser tool 500 is formed of a single piece of material, and is devoid of other parts or components that are attached, coupled, or otherwise secured to the tool. It should be appreciated from the view of FIG. 8 that the fastener dispenser tool 500 can have many of the same or similar features as the fastener dispenser tool 100 of FIG. 1A (or of the other examples of FIGS. 5-7D), such as retention device 510. The fasteners 534 can be loaded into a retention slot 548 from the front end of the fastener dispenser magazine 504. In this way, a rear retention device (e.g., 156) may not be needed because the handle 502 acts to stop the fasteners inside of the fastener dispenser tool 500.

Various types of fasteners can be retained and dispensed from the fastener dispenser magazines exemplified herein. For instance, fasteners such as pop rivets, plastic push plugs (e.g., used in auto manufacturing), and standard hex nuts could be used with the fastener dispenser magazines discussed herein. It will be appreciated that slight modification of the retention slot (and/or the presentation slot) may be required to properly retain such fasteners. In the case of pop rivets, the heads of the pop rivets can be partially (or wholly) retained in a retention slot (e.g., 148), such that the stems of the pop rivets extend upwardly through a presentation slot (e.g., 112). It should be appreciated that the retention slot may need to be much taller than the retention slot 148 shown in FIG. 3 to accommodate the stems of the pop rivets (where the stems extend upwardly), as well as designing the retention slot to accommodate the flanges that extend around the heads of the pop rivets (e.g., similar to the washer/head configuration described regarding FIG. 5). Thus, a single handed rivet gun can be used with this "pop rivet" fastener dispenser magazine example to dispense a lead pop rivet therefrom, similarly as described in the examples discussed herein. That is, a lead pop rivet can be partially inserted into a hole of a structure while retained at the end of the fastener dispenser magazine (e.g., like shown in FIG. 4B), and then the lead pop rivet can be dispensed from the fastener dispenser magazine for final installation into the structure (e.g., like shown in FIG. 40). In a backwards or reverse example, the pop rivets heads can be retained in a retention slot, while the stems extend downwardly through a shaft pass-through portion (e.g., 152). In this way, the fastener dispenser magazine can be held by one hand to load a single rivet at a time into a rivet gun held in the other hand. In this configuration, the fastener dispenser magazine would not be used to align the pop rivet into a hole, but it would be used to retain the pop rivets for purposes of eliminating possible FOD of lost pop rivets, and also for purposes of reducing the amount of time to count, inspect, and dispense the pop rivets from a single tool/magazine.

The fastener dispenser magazines described herein can be mounted (or inserted into a mounted retention sleeve) vertically at a work station so that an operator can quickly load a hand tool (e.g., a rivet gun) without having to handle individual rivets by hand. This orientation can provide a less bulky tool than would otherwise be used.

The fastener dispense magazines described herein can be used to retain and dispense other fasteners or fastener parts, such as nuts (e.g., standard hex nuts, rivnuts, and other types of nuts). In such configuration, the user can pull a nut from a presentation position (e.g., P1) to a dispensing position (e.g., P2) by hand, or with a pick if the nut is too small. The fastener dispense magazine can be used as a kitting device such that the nuts are merely pulled from the fastener dispense magazine and then used in a fastening operation Alternatively, a lead nut can be positioned at the end of the fastener dispense magazine, and then the nut can be initially threadably engaged to a bolt by rotating the fastener dispense magazine to engage threads of the nut to the bolt. Then, the fastener dispense magazine can be pulled away from the nut to dispense the nut, and then the nut can be fully fastened to the bolt by a hand tool.

The fastener dispense magazines described herein can have a lateral curved profile (e.g., in addition to the upward curved profile discussed above). That is, with reference to the top view of FIG. 2B, the presentation section 146 can curve to the right (or left), which can provide additional clearance for particular support structures that receive a lead fastener.

In another example, the retention devices described above (e.g., 110, 410, 510) can instead be a "rocker style" tab that includes an external lever that, when depressed, advances a single lead fastener at a time. In this manner, a hand tool may not be need to advance the lead fastener from the presentation position (e.g. P1) to the dispensing position (e.g., P2). This can be advantageous for fasteners, such as small nuts and "driverless" fasteners such as the automotive push style, because they may not have a feature for which a hand tool may engage. Such rocker style tab can be "dynamic" and have user interface (via lever/button or other mechanism) that advances a single fastener without the use of an external tool.

As should be appreciated from the above description, the fastener dispenser magazines exemplified herein can reduce or eliminate FOD risk, because the individual can view/count the exact amount of fasteners remaining in the magazine during and after a manufacturing process. Moreover, installation time for a high amount of fasteners is dramatically reduced because all or some of the fasteners needed for installation of a particular assembly operation can be held captive by the fastener dispenser magazine. Thus, the individual does not need to repeatedly retrieve or grab individual fasteners for fastening, because the individual can merely hold and use the fastener dispenser magazine between various fastening operations.

As should be appreciated from the various examples discussed above, any type of fasteners (and washers) can be installed and used with a particular fastener dispenser magazine. This can be achieved by designing the retention slot to be sized to retain any particular sized heads and threaded shafts of a set of particularly sized and shaped fasteners.

The fastener dispenser tools of the examples discussed above can be operated by individuals manually, by individuals utilizing power tools, by robotic or other systems capable of operating the fastener dispenser tool, and others. For example, the fastener dispenser magazine can be held in position by a robotic arm and gripper assembly while the fasteners are being dispensed with the assistance of the robotic arm that dispenses the fasteners and threads them into associated hardware. Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A fastener dispenser tool, comprising:
a retention section;
a presentation section extending from the retention section;
a retention slot extending along the retention section and the presentation section, the retention slot operable to retain a plurality of fasteners; and
a presentation slot extending along the presentation section and in open communication with the retention slot, the presentation slot sized to receive a tool bit engageable with a lead fastener of the plurality of fasteners;
a fastener ejection portion that extends outwardly from the presentation section for supporting the lead fastener, the fastener ejection portion comprising first and second side walls that define an ejection opening in fluid communication with the retention slot, the first and second side walls being configured to grip and position the lead fastener while being engaged to a structure,
wherein the retention slot and presentation slot are configured, such that the plurality of fasteners are slidable through the retention slot along the presentation section to facilitate dispensing of the lead fastener from the presentation section.

2. The fastener dispenser tool of claim 1, further comprising a support handle integrally formed with the retention section, such that the fastener dispenser tool is formed from a single, unitary piece of material.

3. The fastener dispenser tool of claim 1, further comprising first and second retention devices supported by the retention section for retaining the plurality of fasteners.

4. The fastener dispenser tool of claim 1, wherein the retention slot defines a first longitudinal axis, and wherein the presentation slot defines a second longitudinal axis that extends transverse the first longitudinal axis.

5. The fastener dispenser tool of claim 1, wherein a portion of the retention slot extends in substantially the same direction as a portion of the presentation slot.

6. The fastener dispenser tool of claim 1, wherein the presentation slot and the retention slot are formed on opposing sides of the presentation section.

7. The fastener dispenser tool of claim 1, wherein the retention slot comprises a head retention portion and a shaft pass-through portion, the head retention portion sized to receive and support heads of the plurality of fasteners, and the shaft pass-through portion sized to receive threaded ends of the plurality of fasteners.

8. The fastener dispenser tool of claim 1, wherein at least a portion of the presentation section comprises a curved profile.

9. The fastener dispenser tool of claim 1, wherein the presentation section comprises a dispensing tip formed such that the retention slot and the presentation slot are exposed proximate the dispensing tip for dispensing of the lead fastener.

10. The fastener dispenser tool of claim 1, further comprising a support handle configured to be held by an individual, wherein the retention section and the presentation section define a fastener dispenser magazine, wherein the fastener dispenser magazine is removably coupleable to support handle.

11. The fastener dispenser tool of claim 10, wherein the support handle comprises a thread protection portion configured to surround threads of the plurality of fasteners when the fastener dispenser magazine is coupled to the support handle.

12. The fastener dispenser tool of claim 10, wherein the support handle comprises a magazine retention device for removably coupling the fastener dispenser magazine to the support handle.

13. A fastener dispensing system, comprising:
a support handle configured to be held by an individual;
a fastener dispenser magazine coupled to the support handle, and comprising a retention slot and a presentation slot the fastener dispenser magazine further comprising a retention section and a presentation section that extends from the retention section, the presentation section comprising the presentation slot formed on an opposing side from the retention slot;
a plurality of fasteners supported by the fastener dispenser magazine within the retention slot; and
a fastening tool comprising a tool bit engageable through the presentation slot and with a lead fastener of the plurality of fasteners;
wherein the plurality of fasteners are slidable through the retention slot along the presentation section to facilitate dispensing of the lead fastener from the fastener dispenser magazine, and
wherein the presentation section comprises a curved profile section that extends from the retention section, such that the lead fastener is moveable to a dispensing position proximate a tip of the fastener dispenser magazine for engagement with a structure, whereby the curved profile section facilitates clearance of remaining fasteners in the fastener dispenser magazine away from the structure.

14. The fastener dispensing system of claim 13, wherein the fastener dispenser magazine comprises first and second retention devices for retaining the plurality of fasteners, and wherein the support handle comprises a magazine retention device for removably coupling to the fastener dispenser magazine.

15. The fastener dispensing system of claim 13, wherein the fastening tool is unattached to the support handle and the fastener dispenser magazine, and wherein the plurality of fasteners are unattached to each other.

16. A method for making a fastener dispenser tool, comprising:
forming a support handle configured to be held by an individual; and
forming a fastener dispenser magazine removably coupleable to the support handle, the fastener dispenser magazine comprising a retention section having a retention slot for retaining a plurality of fasteners, and a presentation section that extends from the retention section, the presentation section sized and configured to facilitate the sliding of the plurality of fasteners through the retention slot along the presentation section to facilitate dispensing of a lead fastener from the fastener dispenser magazine,
wherein the presentation section comprises a curved profile section that extends from the retention section, such that the lead fastener is moveable to a dispensing position proximate a tip of the presentation section for engagement with a structure, whereby the curved profile section facilitates clearance of remaining fasteners of the plurality of fasteners in the retention slot away from the structure.

17. The method of claim 16, further comprising forming first and second retention devices of the fastener dispenser magazine for retaining the plurality of fasteners.

18. The method of claim 16, wherein forming the fastener dispenser magazine comprising forming a retention section comprising the retention slot, and forming a presentation section comprising the presentation slot and formed transverse relative to the retention section, such that the presentation slot is formed through an opposing side of the fastener dispenser magazine from a portion of the presentation slot.

19. A fastener dispenser tool, comprising:
a retention section;
a presentation section extending from the retention section;
a retention slot extending along the retention section and the presentation section, the retention slot operable to retain a plurality of fasteners; and
a presentation slot extending along the presentation section and in open communication with the retention slot, the presentation slot sized to receive a tool bit engageable with a lead fastener of the plurality of fasteners,
wherein the retention slot and presentation slot are configured, such that the plurality of fasteners are slidable through the retention slot along the presentation section to facilitate dispensing of the lead fastener from the presentation section, and
wherein the presentation section comprises a curved profile section that extends from the retention section, such that the lead fastener is moveable to a dispensing position proximate a tip of the presentation section for engagement with a structure, whereby the curved profile section facilitates clearance of remaining fasteners of the plurality of fasteners in the retention slot away from the structure.

* * * * *